F. R. KISSLING.
TILTING STEERING WHEEL.
APPLICATION FILED AUG. 13, 1917.

1,285,737.

Patented Nov. 26, 1918.
2 SHEETS—SHEET 1.

INVENTOR
Frank R. Kissling,
by Wilhelm & Parker.
ATTORNEYS.

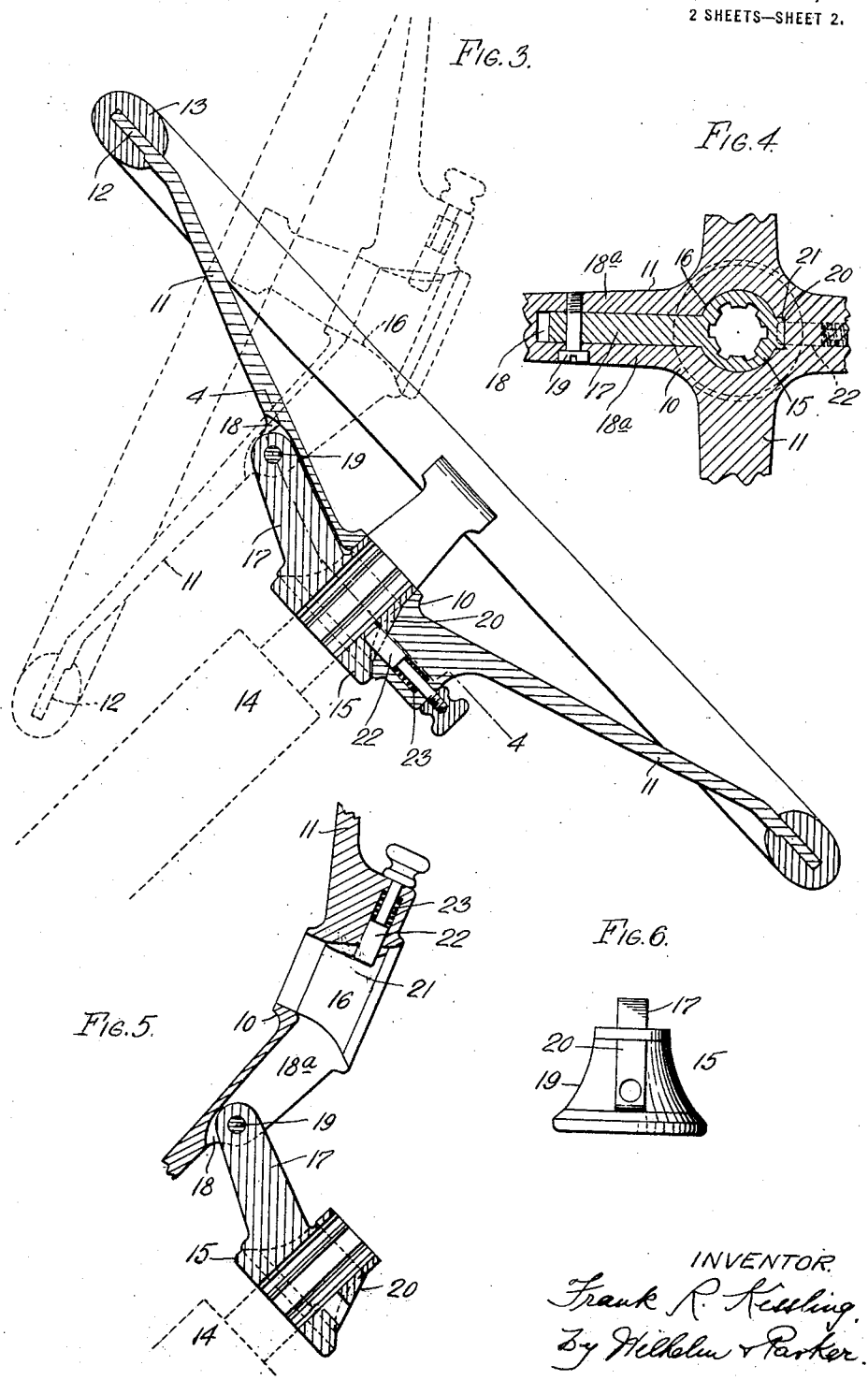

UNITED STATES PATENT OFFICE.

FRANK R. KISSLING, OF BUFFALO, NEW YORK, ASSIGNOR TO THE PIERCE-ARROW MOTOR CAR COMPANY, OF BUFFALO, NEW YORK.

TILTING STEERING-WHEEL.

1,285,737.   Specification of Letters Patent.   Patented Nov. 26, 1918.

Application filed August 13, 1917. Serial No. 185,815.

*To all whom it may concern:*

Be it known that I, FRANK R. KISSLING, a citizen of the United States, residing at Buffalo, in the county of Erie and State of New York, have invented a new and useful Improvement in Tilting Steering-Wheels, of which the following is a specification.

This invention relates to steering wheels for automobiles and other vehicles or devices, and more particularly to steering wheels which are adapted to be tilted or swung from the normal operative position to a position more or less parallel with the steering column, so as to afford more room for persons entering and leaving the vehicle.

Tilting steering wheels as heretofore made are of complicated and cumbersome constructions, such that the space inclosed by the rim of the wheel is so filled up with obstructions as to interfere with the easy and comfortable handling of the wheels and to render them objectionable in appearance.

The object of the invention is to produce a tilting steering wheel of simple but strong and rigid construction, which is substantially similar in shape and appearance to the standard non-tilting wheels, and has the desirable qualities of the latter, but is nevertheless adapted to be tilted or swung out of the way to afford as much room as other more complicated and cumbersome constructions.

In the accompanying drawings:—

Fig. 3 is a sectional elevation on an enlarged scale thereof, showing by full and broken lines the operative and tilted positions of the wheel.

Fig. 4 is a section thereof on line 4—4, Fig. 3.

Fig. 5 is a fragmentary sectional elevation, showing the wheel tilted.

Fig. 6 is a side elevation of the head of the steering post.

Figure 1:
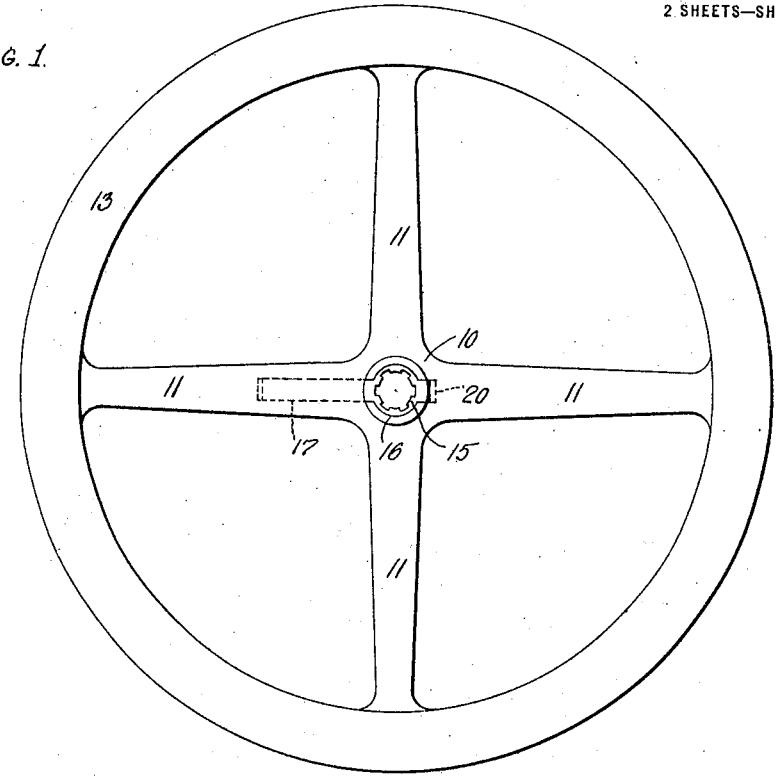
Figure 1 is a plan view of a tilting steering wheel embodying the invention.
Figure 2:
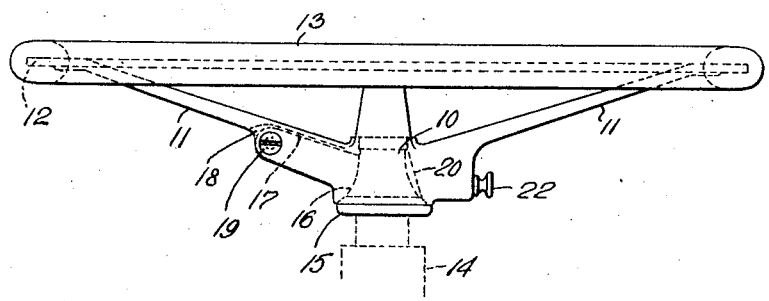
Fig. 2 is a side elevation thereof.

The steering wheel comprises a hub 10, spokes or arms 11 extending outwardly therefrom, and a rim rigidly connected to the spokes. As usual the hub and spokes are preferably integral with each other and with a circular metal ring or band 12 which is incased by a rim 13 of wood or other suitable material forming a comfortable grip for the hands.

14 represents the steering post, which is provided at its upper end with a head or part 15 which can be rigidly secured to the post in any suitable manner or formed thereon. This head enters and fits in a correspondingly shaped socket or opening 16 in the hub of the steering wheel and is provided with a forwardly and preferably upwardly projecting arm 17 on the outer portion of which the steering wheel is hinged or pivoted to swing from its operative position to the tilted position shown by broken lines in Fig. 3. One of the spokes of the steering wheel is provided with a downwardly opening radial slot or recess 18 to receive the hinge arm 17 and is hinged thereto by a suitable screw or pivot 19 extending through the arm and through the parts of the spoke at opposite sides of the slot 18. The slot or recess 18 is preferably formed by spaced vertical walls or flanges 18ᵃ depending from the underside of the spoke, the body of the spoke covering or closing the slot above so that it is not seen from the top of the wheel. Preferably the post head 15 is tapered and concaved as shown at 19 and the socket 16 therefor in the hub is correspondingly shaped so that the head can fit tightly in the socket and prevent play or rattling of the wheel when in its operative position, while, nevertheless, enabling the wheel to swing freely without looseness to and from its tilted position. The post head is also preferably provided opposite the arm 17 with a longitudinal rib 20 adapted to fit in a groove 21 in the hub to further assist in preventing play and holding the wheel rigid with the post when the wheel is in its operative position. The slotted or flanged part of the spoke which is hinged to the arm 17 is preferably made deeper than the remaining portion of the spoke to afford the requisite strength and rigidity at the hinge connection, but otherwise the spokes of the wheel can be of substantially the size, shape and arrangement usual in standard non-tilting wheels, that is, the spokes are preferably radial and of the usual slender and relatively thin shape having their greatest cross sectional dimension horizontal.

The steering wheel is releasably held in its operative position perpendicular to the post by a suitable catch or holding device, which in the construction shown, consists of a bolt 22 slidably mounted on the underside of the wheel at the side of the hub opposite the hinge and is adapted to be projected by a suitable spring 23 into a hole in the post head 15 for securing the wheel. The bolt is provided at its outer end with a knob or handle for withdrawing it to release the wheel.

I claim as my invention:—

1. The combination of a steering wheel provided with a hub and with spokes extending radially from said hub, a steering post, an upwardly tapering head rigid with said post adapted to fit tightly in a correspondingly tapered socket in said wheel hub, and an arm projecting outwardly from the head beyond said hub in the vertical plane of one of said wheel spokes, said spoke having a downwardly opening radial slot with fixed side walls which straddle said arm and bear against opposite sides thereof from said hub to the outer portion of said arm, a pivot connecting said spoke and said arm to permit the wheel to tilt, and a catch for releasably holding said wheel in operative position with said post head in the hub socket.

2. The combination of a steering wheel provided with a hub and with spokes extending radially from said hub, a steering post, an upwardly tapering head rigid with said post adapted to fit tightly in a correspondingly tapered socket in said wheel hub, and an arm projecting outwardly from the head beyond said hub beneath one of said wheel spokes, said spoke having spaced integral flanges which depend from its underside and straddle said arm and bear flat against opposite sides thereof for a material portion of the length of said arm, a pivot connecting said flanges to said arm to permit the wheel to tilt, and a catch for releasably holding said wheel in operative position with said post head in the hub socket.

Witness my hand this 9th day of August, 1917.

FRANK R. KISSLING.

Witnesses:
W. C. EWALD,
J. R. WAY.